H. C. RASSMANN.
WATERING DEVICE FOR CATTLE.
APPLICATION FILED FEB. 12, 1917.
1,260,805.
Patented Mar. 26, 1918.
2 SHEETS—SHEET 2.
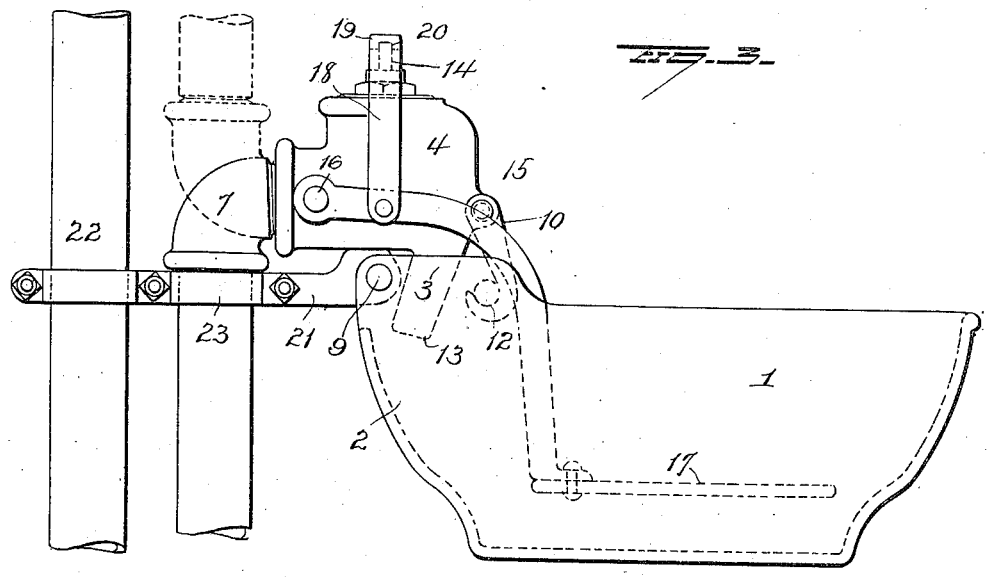

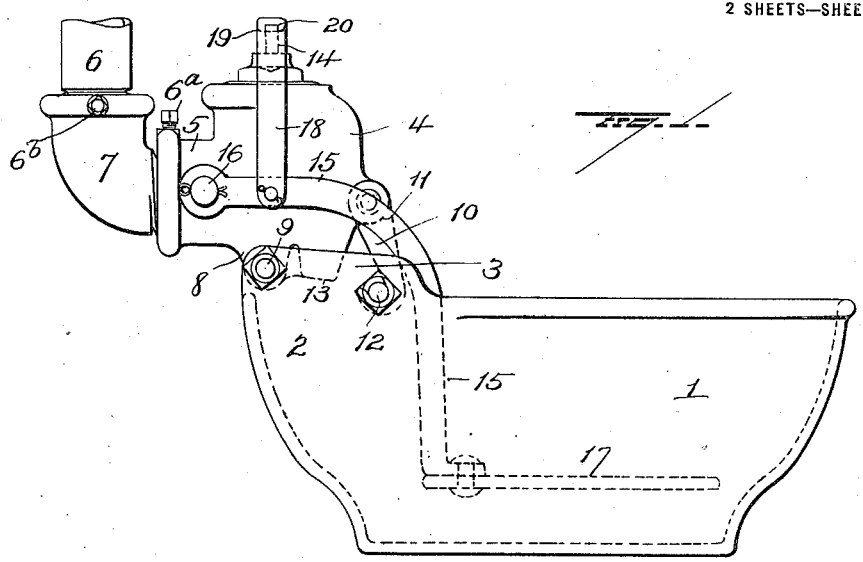
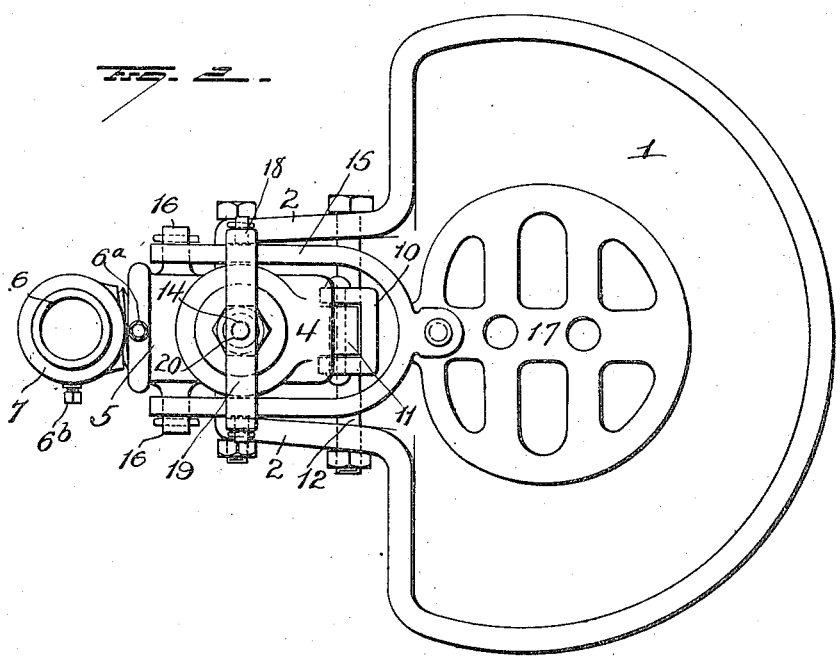

UNITED STATES PATENT OFFICE.

HUGO C. RASSMANN, OF BEAVER DAM, WISCONSIN.

WATERING DEVICE FOR CATTLE.

1,260,805.  Specification of Letters Patent.  Patented Mar. 26, 1918.

Application filed February 12, 1917. Serial No. 148,139.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle and particularly to such as employ means adapted to be operated by the cattle to control the supply of water to the bowl, one object of my present invention being to so construct the device that the same may be easily and conveniently located and supported as the surroundings in the particular stall or other place where it may be desired to use the device, may require.

A further object is to so construct the device, that the same shall comprise a unitary structure with which a supply pipe may be coupled, whether said pipe be led to the device from the top, bottom, sides or rear,—the device being provided with a single inlet with which the supply pipe may be coupled.

A further object is to simplify the construction of watering devices for cattle and to economize the cost of manufacture and at the same time enhance its efficiency.

With these and other objects in view, the invention consists in certain novel features of construction and combinations of parts as hereinafter set forth and pointed out in the claims.

In the accompanying drawings, Figure 1 is a side elevation of a watering device embodying my improvements; Fig. 2 is a plan view, and Fig. 3 is a view of a modification.

1 represents a bowl which may have a general circular form and provided with an offset portion 2, the latter having flanges 3 projecting upwardly above the plane of the top of the upper edges of the bowl.

The bowl 2 is supported from a valve casing or housing 4 and the latter is made with a single nipple 5 with which a supply pipe 6 may be connected by means of a coupling 7 or in any other suitable manner. Set screws 6ª and 6ᵇ may be provided for preventing the casing or housing from turning on the coupling and for preventing the coupling from turning on the supply pipe. The supply pipe may be led to the valve casing from the top, bottom, rear, or sides of said casing, as the surrounding of the place where it may be desired to locate the watering device may require.

In the present instance, the bowl is pivotally connected at or near its upper edge with the bottom of the valve casing, and in effecting such connection, the valve casing is provided with depending lugs 8 for the reception of a pivot 9, which latter may consist of a rod mounted in the flanged portion 3 of the bowl.

The bowl is retained normally in a horizontal position by means of a latch 10 pivotally attached to a lug 11 projecting from the front of the valve casing,—said latch being made in the form of a hook and adapted to engage a part in the offset portion of the bowl in advance of the pivotal connection of the latter with said valve casing. In the present instance I have shown a rod 12 mounted in the offset portion of the bowl, to be engaged by the latch.

The valve casing or fount 4 is provided with an outlet spout 13 which depends therefrom in a diagonal direction between the pivotal mounting of the bowl and the latch device, so as to discharge water into the offset portion of the bowl without danger of permitting the water to splash against either said pivotal mounting or the latch device.

A valve (not shown) is located within the casing or fount 4 for controlling the passage of water therethrough, and this valve may be constructed as illustrated in my previous Patent No. 1,210,693, issued January 2nd, 1917, with its stem 14 projecting above the casing. The valve will be controlled by the action of the animal, and the means for this purpose may comprise a lever 15, in the form of a bail pivotally mounted on trunnions 16 located on the valve casing rearwardly of the pivotal connection of the bowl with the latter. The lever bail 15 enters the bowl and a perforated platform 17 is secured thereto so as to be disposed within the bowl above the bottom thereof. A saddle 18 embraces the casing 1 and the lower ends of its parallel arms are pivotally connected with the respective side members of the lever-bail comparatively short distances from the pivotal mountings of said lever-bail. The cross bar 19 of the saddle is provided centrally with a socket 20 into which the upper end of the valve stem 14 enters.

With the construction and arrangement of parts above described, the bowl may be lowered by first raising it slightly to effect disengagement from the latch. This will cause the contents of the bowl to be emptied and the bowl will be in a position which will permit it to be cleaned,—the lever and platform remaining in their normal positions out of the way while the bowl is being cleaned. The saddle may then be removed from the valve stem and the lever and platform permitted to drop by gravity into the bowl (the pivotal mounting of the lever being rearwardly of the pivotal support of the bowl) where it will be protected from injury.

Instead of pivotally connecting the upper edge of the bowl directly to the bottom of the valve casing or fount 4, it may be pivotally supported by means of a bracket 21 secured at one end to a stall post 22 or other fixed part of the stall and terminating at its other end directly under the casing or fount 4, where the bowl is pivotally connected to it. The bracket 21 may be provided between its ends with a loop 23 which may be utilized when the coupling 7 which connects the supply pipe with the valve casing, projects downwardly.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a watering device for animals, the combination with a valved fount, of a bowl pivotally supported near its upper edge under the same, said bowl projecting outwardly from the fount, a latch located in front of the pivotal support of the bowl and connecting the bowl with the fount, and animal operated means projecting into the bowl and connected with the valve of said valved fount.

2. In a watering device for cattle, the combination with a fount provided with a valve, and a bowl to receive water from said fount, said bowl pivotally supported near its upper edge under the fount, of a lever pivoted to the fount rearwardly of the pivotal support of the bowl, a platform secured to said lever and normally disposed within the bowl, and means connecting said lever with the stem of the valve.

3. In a watering device for cattle, the combination with a fount provided with a valve, a bowl pivotally connected near its upper edge with the bottom of the fount, and a latch connecting the bowl with the front of the fount, of a lever pivoted to the fount in rear of the pivotal support of the bowl, and a valve operating device connected with the lever in front of the connection of the latter with the fount.

In testimony whereof, I have signed this specification in the presence of two subscribing witnesses.

HUGO C. RASSMANN.

Witnesses:
H. R. VETTER,
E. J. LAWRENCE.

Copies of this patent may be obtained for five cents each, by addressing the "Commissioner of Patents, Washington, D. C."